(12) United States Patent
Wood

(10) Patent No.: US 10,286,972 B2
(45) Date of Patent: *May 14, 2019

(54) SELF-BALANCING ELECTRIC VEHICLE WITH STRAIN-BASED CONTROLS

(71) Applicant: Focus Designs Inc., Camas, WA (US)

(72) Inventor: Daniel J. Wood, Camas, WA (US)

(73) Assignee: Focus Designs Inc., Camas, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/684,045

(22) Filed: Aug. 23, 2017

(65) Prior Publication Data

US 2017/0349231 A1 Dec. 7, 2017

Related U.S. Application Data

(63) Continuation of application No. 15/295,669, filed on Oct. 17, 2016, now Pat. No. 9,745,013.

(60) Provisional application No. 62/288,460, filed on Jan. 29, 2016, provisional application No. 62/258,230, filed on Nov. 20, 2015, provisional application No. 62/246,615, filed on Oct. 27, 2015, provisional application No. 62/241,772, filed on Oct. 15, 2015.

(51) Int. Cl.
*B62K 11/00* (2006.01)
*G01G 3/14* (2006.01)
*G01G 19/12* (2006.01)
*G01G 19/52* (2006.01)

(52) U.S. Cl.
CPC .......... *B62K 11/007* (2016.11); *G01G 3/1402* (2013.01); *G01G 19/12* (2013.01); *G01G 19/52* (2013.01)

(58) Field of Classification Search
CPC .............................. B62K 11/007; G01G 19/12
See application file for complete search history.

(56) References Cited

U.S. PATENT DOCUMENTS

| | | | |
|---|---|---|---|
| 7,481,291 B2 | 1/2009 | Nishikawa | |
| 7,740,099 B2 | 6/2010 | Field et al. | |
| 7,958,961 B1 | 6/2011 | Schade | |
| 9,376,155 B2 | 1/2016 | Ying et al. | |

(Continued)

FOREIGN PATENT DOCUMENTS

| | | |
|---|---|---|
| CN | 104014123 A | 9/2014 |
| CN | 104958894 A | 10/2015 |

OTHER PUBLICATIONS

Dec. 6, 2016, Office action from the U.S. Patent and Trademark Office in U.S. Appl. No. 15/295,669, which this application shares the benefit of priority.

(Continued)

*Primary Examiner* — Kevin Hurley
(74) *Attorney, Agent, or Firm* — Kolitch Romano LLP

(57) ABSTRACT

A self-balancing electric vehicle may include an elongate platform having a first foot placement section and a second foot placement section rigidly coupled to each other, a first and second wheel being respectively coupled to opposite ends of the platform. Rider presence and turning intentions may be determined based on strain induced in the platform by the rider. The strain may be detected by one or more strain gauge systems. One of the strain gauge systems may be configured for use in a steering control circuit, and may include a strain gauge sensor mounted diagonally with respect to a long axis of the platform, such that the strain gauge detects only twist-induced strain.

20 Claims, 13 Drawing Sheets

(56) References Cited

U.S. PATENT DOCUMENTS

| | | |
|---|---|---|
| 9,452,802 B2 | 9/2016 | Ying |
| 2009/0108553 A1 | 4/2009 | Serai et al. |
| 2010/0114468 A1 | 5/2010 | Field et al. |
| 2012/0166048 A1 | 6/2012 | Inoue et al. |
| 2013/0238231 A1 | 9/2013 | Chen |
| 2013/0248573 A1 | 9/2013 | Kim et al. |
| 2014/0326525 A1 | 11/2014 | Doerksen |

OTHER PUBLICATIONS

Jan. 13, 2017, International Search Report of the International Searching Authority from the U.S. Receiving Office in PCT/US2016/057406, which is the international application which shares the benefit of priority as this U.S. application.

Jan. 13, 2017, Written Opinion of the International Searching Authority from the U.S. Receiving Office in PCT/US2016/057406, which is the international application which shares the benefit of priority as this U.S. application.

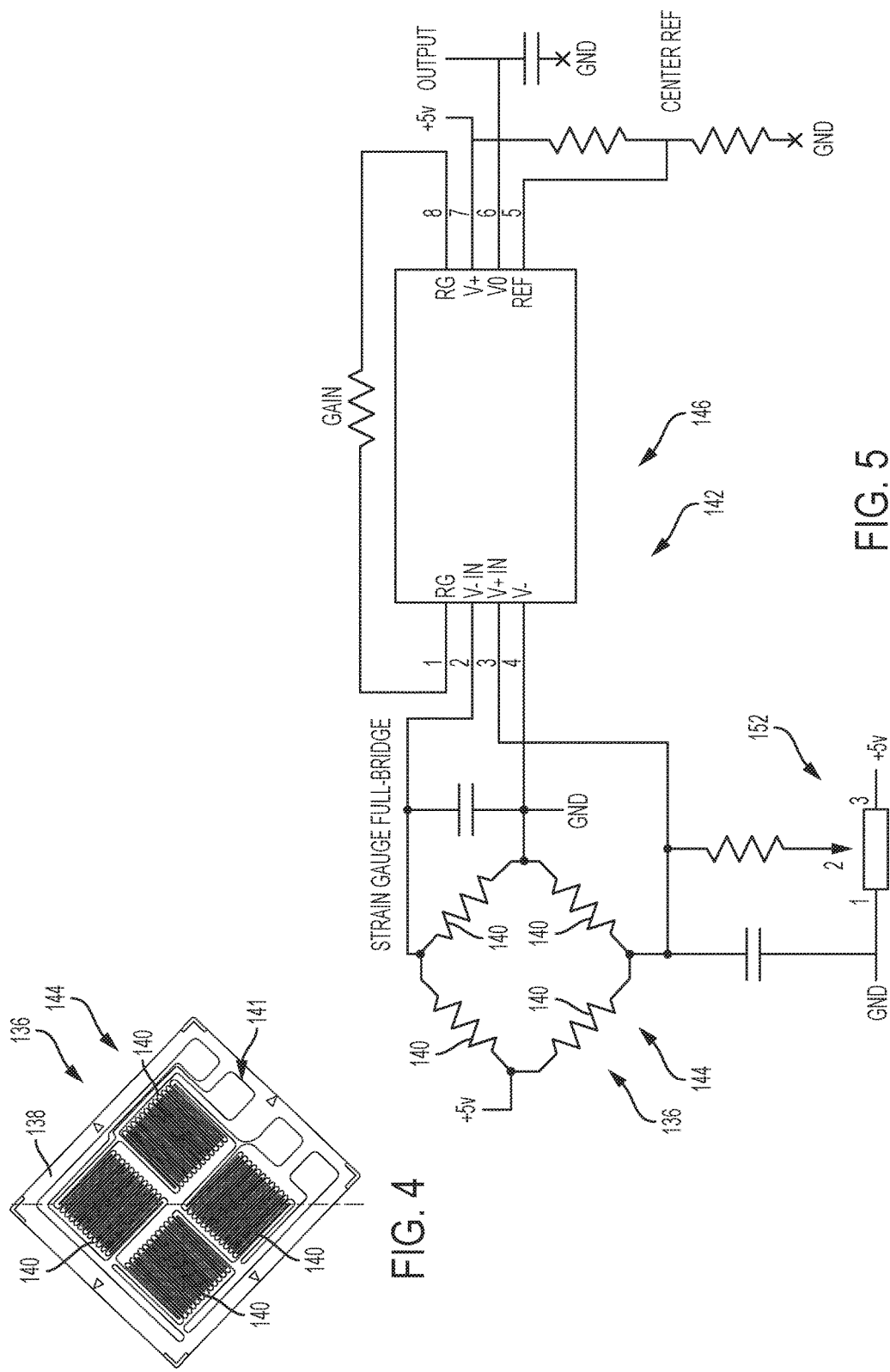

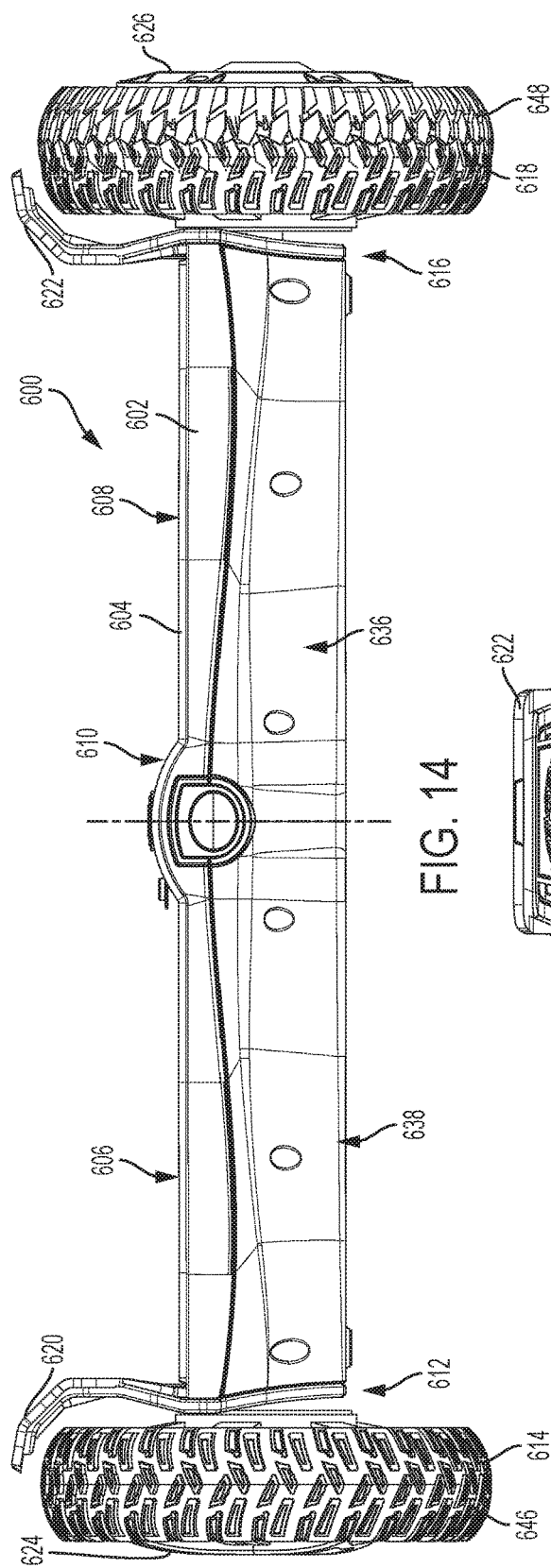
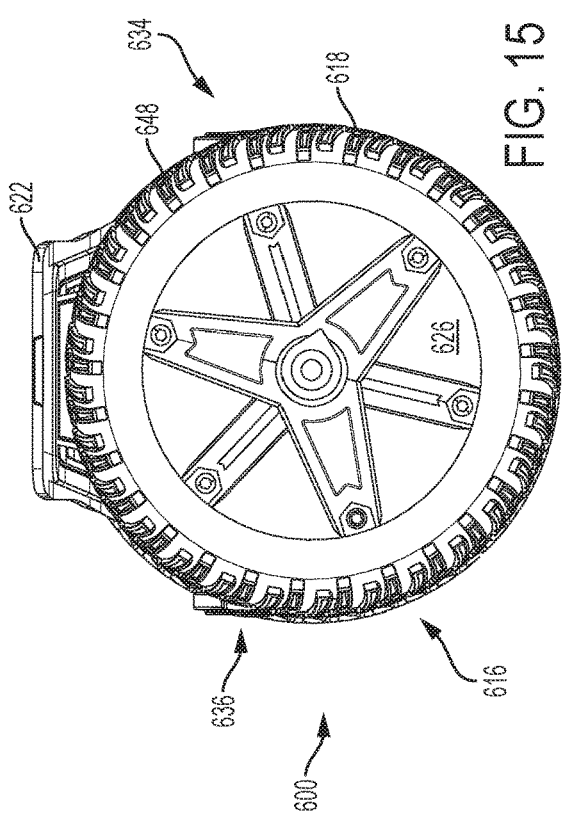

SELF-BALANCING ELECTRIC VEHICLE WITH STRAIN-BASED CONTROLS

CROSS-REFERENCES

This application claims the benefit under 35 U.S.C. § 119(e) of the priority of U.S. Provisional Patent Application Ser. Nos. 62/241,772 (filed Oct. 15, 2015), 62/246,615 (filed Oct. 27, 2015), 62/258,230 (filed Nov. 20, 2015), and 62/288,460 (filed Jan. 29, 2016), the entireties of which are hereby incorporated by reference for all purposes.

INTRODUCTION

The popularity of two-wheeled, forward-facing, self-balancing electric vehicles, known commonly as "hoverboards," has grown considerably over the past several years. Many companies have entered the hoverboard market, with slightly differing designs. Generally speaking, balance and steering control systems for these vehicles have suffered from various issues, such as safety and reliability problems, inclusion of numerous moving parts, related manufacturing complexity and expense, and a lack of customizability of riding characteristics. A need exists for a simpler and more reliable control system for these electric vehicles.

SUMMARY

Two-wheeled self-balancing electric vehicles according to the present teachings overcome the issues described above by using one or more strain gauge systems to detect rider-induced strain on a rigid rider platform.

The present disclosure provides systems, apparatuses, and methods relating to self-balancing vehicles. In some embodiments, a self-balancing electric vehicle may include: a platform defining a long axis, a first foot placement section, and a second foot placement section rigidly coupled to the first foot placement section; a first wheel disposed adjacent to a first lateral end of the platform and a second wheel disposed adjacent to a second lateral end of the platform, wherein the first and second wheels share a common axis of rotation parallel to the long axis of the platform; a balance position sensor attached to the platform and configured to sense inclination of the platform; a first strain gauge attached to the platform and configured to sense twisting strain in the platform induced by imbalanced forces exerted upon the first and second foot placement sections; a first drive motor configured to drive the first wheel, and a second drive motor configured to drive the second wheel, wherein the drive motors are configured to drive the wheels toward self-balancing the platform in response to inclination of the platform sensed by the balance position sensor, and to drive the wheels differentially to cause the vehicle to turn in response to twisting strain sensed by the first strain gauge.

In some embodiments, a self-balancing electric vehicle may include: a rigid platform including a first foot placement section and a second foot placement section which is immovable with respect to, or substantially rigidly attached to the first foot placement section; a first wheel associated with the first foot placement section and a second wheel associated with the second foot placement section, wherein the first and second wheels are spaced apart and substantially parallel to one another; a first drive motor configured to drive the first wheel, and a second drive motor configured to drive the second wheel; a vehicle balance position sensor coupled to the rigid platform; and a strain gauge coupled to the rigid platform; wherein the drive motors are configured to drive the wheels toward self-balancing the platform in response to data from the vehicle balance position sensor, the drive motors are configured to drive the wheels differentially to cause the vehicle to turn in response to data from the strain gauge indicating imbalanced forces on the first and second foot placement sections, and the drive motors are configured to drive the wheels in unison to cause the vehicle to move linearly in response to balanced forces on the first and second foot placement sections.

In some embodiments, a self-balancing electric vehicle may include: a platform including a first foot placement section and a second foot placement section which are substantially rigidly attached to each other; a first wheel associated with a first lateral side of the platform and a second wheel associated with a second lateral side of the platform, wherein the first and second wheels are spaced apart and share a common axis of rotation which is substantially parallel to a long axis of the platform; a balance position sensor configured to sense rotation of the platform about its long axis; a first strain gauge configured to sense strain induced in the platform by imbalanced forces applied to the first foot placement section and the second foot placement section; a first drive motor configured to drive the first wheel, and a second drive motor configured to drive the second wheel, wherein the drive motors are configured to drive the wheels toward self-balancing the platform in response to rotation of the platform sensed by the balance position sensor, and to drive the wheels differentially to cause the vehicle to turn in response to strain sensed by the first strain gauge.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 4 is a plan view of an illustrative full bridge strain gauge sensor suitable for use in vehicles described herein.

FIG. 5 is a schematic circuit diagram of an illustrative strain gauge sensor and amplification circuit suitable for use in vehicles described herein.

FIG. 14 is a rear elevation view of the vehicle of FIG. 10.

FIG. 15 is a side elevation view of the vehicle of FIG. 10.

DESCRIPTION

Figure 1:
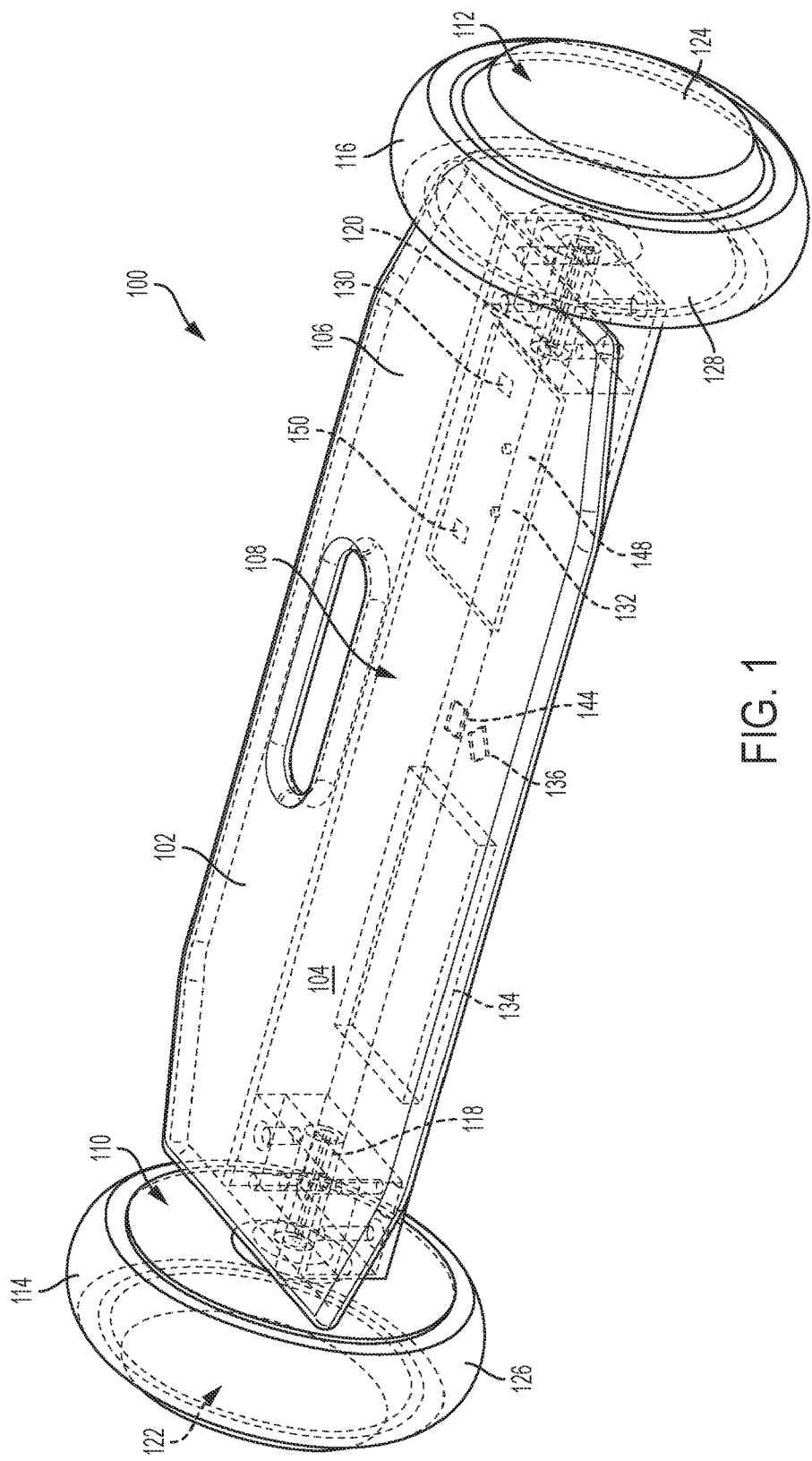
FIG. 1 is an isometric front oblique view of an illustrative two-wheeled self-balancing vehicle having induced-strain rider detection and turn controls in accordance with aspects of the present disclosure.

Various aspects and examples of a two-wheeled, self-balancing electric vehicle having strain-based controls, as well as related methods, are described below and illustrated in the associated drawings. Unless otherwise specified, a self-balancing vehicle in accordance with the present teachings, and/or its various components, may, but are not required to, contain at least one of the structure, components, functionality, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

Definitions

The following definitions apply herein, unless otherwise indicated.

"Substantially" means to be essentially conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"Rigidly coupled" and "substantially rigidly coupled" with respect to the foot placement sections mean that the foot placement sections are not coupled to each other by a rotatable mechanism such as a pivot or a bearing. However, some microscopic amount of movement between the foot placement sections still might occur, as must be the case for the strain gauge to detect any strain. These microscopic movements are not precluded by the rigid coupling of the foot placement sections to each other.

"Immovable" with respect to the foot placement sections means that the foot placement sections do not move relative to each other in a macroscopic manner, such as through visible rotations. However, some microscopic amount of movement between the foot placement sections still might occur, as must be the case for the strain gauge to detect any strain. These microscopic movements are not precluded by the relative "immovability" of the foot placement sections.

"Rigidly attached" and "substantially rigidly attached" with respect to the foot placement sections mean that the foot placement sections are not attached to each other by a rotatable connection mechanism such as a pivot or a bearing. However, some microscopic amount of movement between the foot placement sections still might occur, as must be the case for the strain gauge to detect any strain. These microscopic movements are not precluded by the rigid attachment of the foot placement sections to each other.

"Rigid" with respect to the platforms described herein similarly means that the platform does not include sections that change their relative orientation or position to a macroscopic degree. However, a rigid platform still can undergo microscopic deformations, and portions of the platform sill may move or rotate by small amounts relative to each other, while remaining "rigid" as that term is used herein.

Overview

In general, two-wheeled, self-balancing, electric vehicles in accordance with aspects of the present disclosure may include a personal vehicle having a rigid riding platform with a wheel at each lateral end, the platform including a pair of foot placement sections rigidly attached to each other. A rider's feet may be received on the foot placement sections with toes generally pointed in the direction of travel. Each foot placement section may have an associated wheel and motor, wherein the respective motors are controlled to drive the vehicle toward self-balancing.

Controls including one or more strain gauge systems are configured to measure the effects of rider-induced forces on the foot placement sections, giving the rider precise control over the magnitude and direction of yaw (i.e., turning) movements. Various embodiments are disclosed herein, including examples having an additional strain gauge system used to detect a rider's presence by detecting the rider's weight. In some examples, the measured weight of a rider may be used to adjust the aggressiveness or other characteristics of the balance controls. In some examples, wireless communication connectivity may be used to customize a ride experience.

In the vehicles described herein, a desired turn may be commanded by the rider by applying toe pressure on one foot placement section and simultaneously applying heel pressure on the other foot placement section. Steering controls of the vehicle will respond, using a strain gauge system to detect the twist strain induced on the vehicle by the rider's differentially applied forces. Accordingly, an effective and simple system may be used to control, for example, a vehicle having a single rigid platform (or a pair of foot placement sections that are otherwise rigidly connected). As stated previously, a "rigid platform" in this context means a platform with sections that do not move or rotate macroscopically with respect to each other. However, the foot placement sections of a rigid platform still may undergo small relative displacements and rotations, corresponding to strain detectable by a strain gauge system.

In some examples, the center area of the vehicle platform includes a Wheatstone full-bridge strain gauge (or the like) and an associated amplifier, configured to detect the induced stress on the vehicle applied as a result of the rider's body position. As the rider shifts weight between toe and heel on each side platform, a twisting (i.e., torque) stress is induced into the frame. This twisting stress is measured by the strain gauge system. The detected twisting/torque stress is then used to determine how to command the vehicle to turn (yaw) based on the magnitude and direction of the rider's intended turn. Additionally, in some examples, a second system having a similar Wheatstone full-bridge strain gauge may be coupled to the frame to measure stresses induced by the rider's weight. This rider detection strain gauge may be disposed in any suitable location, such as the center area of the platform (bottom or top).

The second system is configured to measure rider weight, and correspondingly to detect when a rider is present. If present, power may be enabled to the motors. If not present, power is safely shut off. The rider weight measurement may also be used to set the aggressiveness of the proportional-integral-derivative (PID) controller (also referred to as a PID loop) of the self-balancing controls. For example, a softer control may automatically be implemented for lightweight riders, and a stronger, more aggressive control for heavier riders, thereby greatly adding to the safety of the vehicle.

Examples, Components, and Alternative

The following sections describe selected aspects of exemplary self-balancing vehicles, as well as related systems and/or methods. The examples in these sections are intended for illustration and should not be interpreted as limiting the entire scope of the present disclosure. Each section may include one or more distinct embodiments or examples, and/or contextual or related information, function, and/or structure.

First Illustrative Self-Balancing Vehicle

As shown in FIGS. 1-5, this section describes an illustrative two-wheeled self-balancing vehicle 100 including controls having one or more strain gauge systems, as well as related methods. Vehicle 100 is an example of the vehicles described in the Overview section above.

Figure 2:
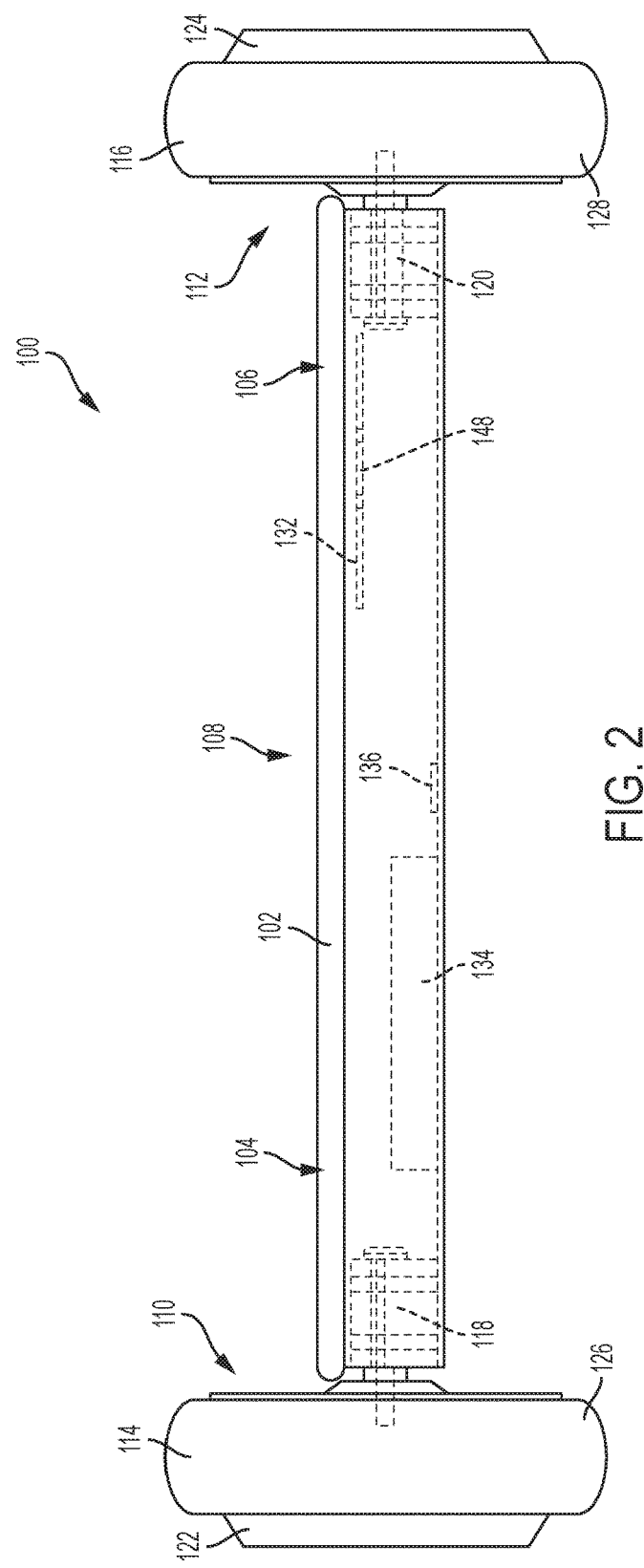
FIG. 2 is a front elevation view of the vehicle of FIG. 1.
Figure 3:
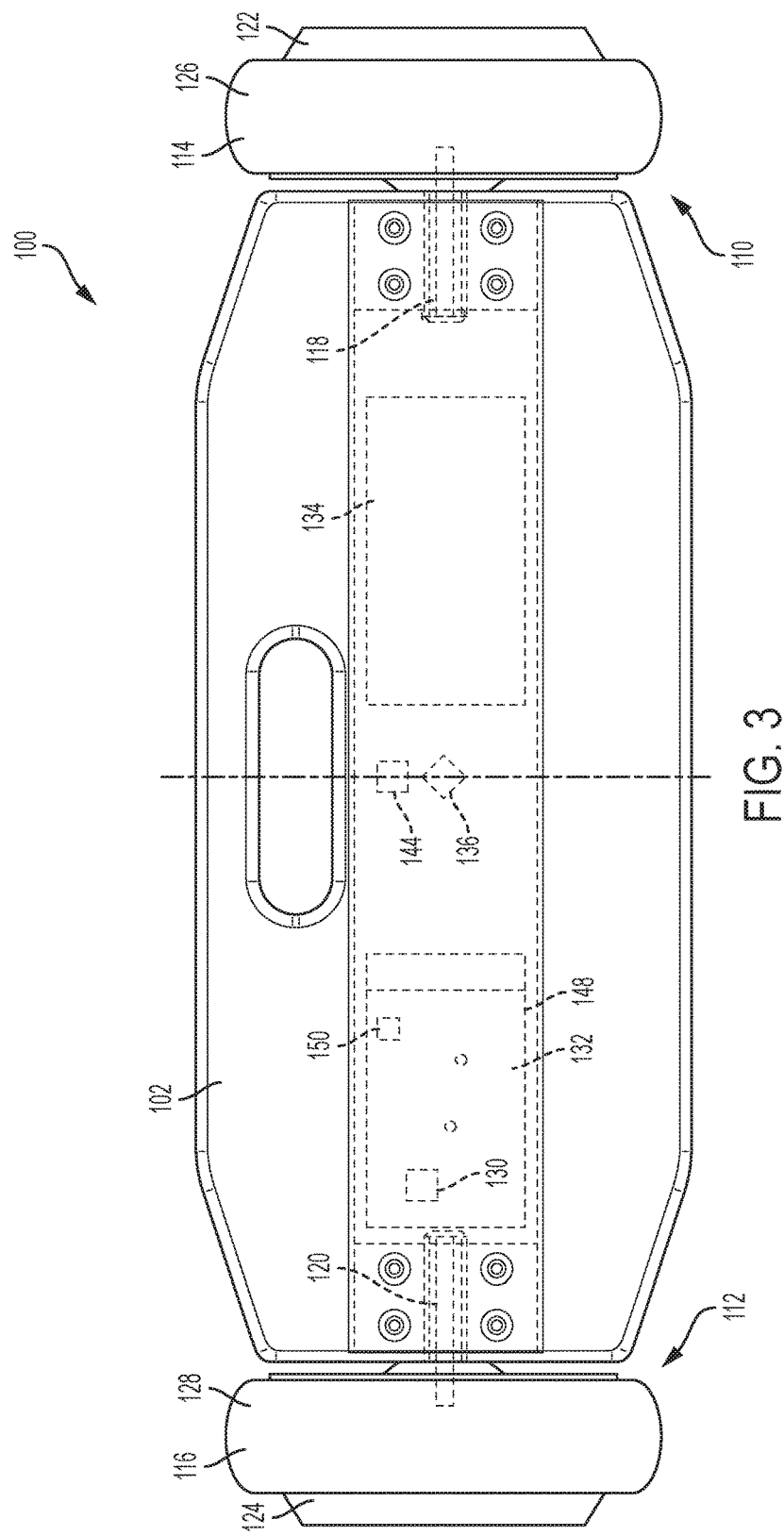
FIG. 3 is a bottom plan view of the vehicle of FIG. 1.

FIG. 1 is an isometric front oblique view of vehicle 100. FIG. 2 is a front elevation view of the vehicle. FIG. 3 is a bottom plan view of the vehicle. FIG. 4 is a plan view of an illustrative full bridge strain gauge sensor suitable for use in vehicle 100 and others. FIG. 5 is a schematic circuit diagram of an illustrative strain gauge sensor and amplification circuit suitable for use in vehicle 100 and others.

With reference to FIGS. 1-3, vehicle 100 includes a fixed frame 102 having two foot placement areas 104, 106, coupled together, each foot placement area being of sufficient size to receive the foot of a user with toes pointed generally in the direction of travel. Each foot placement area may include a surface tread to provide traction. Together, foot placement areas 104 and 106 may form an elongate, rigid riding or foot platform. Accordingly, foot placement areas 104 and 106 may each be referred to as a platform portion. Frame 102 may include any suitable structure configured such that foot placement areas 104 and 106 are fixed to each other with negligible flex or movement. Certain areas, e.g., a center region 108, of frame 102 will be induced with stress from the rider, due to the rider's body orientation.

Motorized hub assemblies 110 and 112 are operatively connected to each lateral end portion of frame 102 to drive respective wheels 114 and 116 mounted with axles 118 and 120, as shown in FIGS. 1-3. Motorized hub assemblies 110 and 112 may include any suitable hub motor, such as typical hub motors known in the art. For example, the drive arrangement may use any combination of brushless direct current (i.e., BLDC) hub motors 122 and 124 with integrated tires 126 and 128. In other examples, a separate wheel and drive motor (brushed or brushless) may be utilized, with power transferred via a chain or transmission. In some examples, a hubless wheel may be driven by a friction drive motor.

A balance position sensor 130 is coupled (e.g., mounted) to frame 102, and configured to sense a tilt position of the vehicle frame (i.e., rotation of the vehicle platform about its long axis). Balance position sensor 130 may include a combined microelectromechanical systems (MEMS) inertial sensor, such as a six-axis rate gyro and accelerometer. In some examples, sensor 130 is configured to provide a measurement of the position (inclination and inertial movement) of the entire frame 102. Sensor 130 is preferably mounted on a circuit board 132 which is attached to frame 102. Sensor 130 may be disposed in any suitable location on the frame. However, a location closer to the center of the vehicle may provide reduced centrifugal force errors caused by vehicle movement.

A rechargeable battery 134 and battery protection circuit is mounted to frame 102 to provide power for the vehicle. Battery 134 may include any suitable power storage device, such as a lithium ion battery.

A first (twist-sensing) full-bridge strain gauge 136 is bonded, e.g., at a 45-degree angle, onto frame 102 of vehicle 100. An example of a full-bridge strain gauge is shown in FIG. 4. Strain gauge 136 may include a flexible, insulating substrate 138 supporting one or more conductive foil zig-zag patterns 140. Deformation of pattern 140 changes the electrical resistance of the pattern, which can be measured at leads 141. The change in resistance can then be used to infer the magnitude of induced stress, according to known methods.

Strain gauge 136 may be located at or near center region 108 (i.e., between or at the intersection of foot placement areas 104 and 106), or anywhere a majority of strain is induced from the twisting action caused by the rider. Strain gauge 136 is configured to detect strains (and therefore stresses) induced by imbalanced forces on the two foot placement areas 104 and 106, specifically twisting strain on vehicle 100 induced by the rider. For greater clarity, the term "imbalanced forces" used throughout the present disclosure means forces that result in a twisting stress (i.e. a torsional stress), and therefore a torsional strain on the frame 102. In normal parlance, an object that receives imbalanced forces necessarily undergoes an acceleration directly from the forces. However, for the purposes of the present disclosure the term "imbalanced forces" means only that the forces result in the aforementioned twisting stress; the forces do not necessarily directly accelerate the vehicle 100. The rider can easily induce this strain by pressing down with the toes on one foot and simultaneously pressing down with the heel on the other foot. Placing the twist-sensing strain gauge on the top (or bottom) of the center region 108 of frame 102 (for example), at a 45-degree angle with respect to the long axis of the vehicle (i.e., diagonally), may only measure torque/twist strain on the vehicle induced from the rider and will effectively ignore strain caused solely by the weight of the rider. Proper alignment of this gauge may therefore prevent unwanted detection of strain from the rider's weight and other factors. In some examples, a single or half-bridge strain gauge may instead be used. In this example, as shown in FIGS. 1-3, strain gauge 136 is bonded to frame 102 on a 45-degree angle, on a bottom surface inside the frame, such that the strain gauge will detect symmetrical twist-induced strains on frame 102 while also being protected from the elements.

As shown in FIG. 5, the analog output of strain gauge 136 may be amplified with an amplifier circuit 142. Circuit 142 may include any suitable amplification components, and is illustrative in nature. The yaw (turning) direction and speed (or torque) can be derived from the analog voltage, when an operational amplifier is used to detect the voltage shift caused by the strain gauge pairs stretching and/or compressing in response to the induced stresses on the vehicle. Circuit 142 provides a method for measuring these small voltage changes and supplying an output voltage (corresponding to an intended turn) to a microcontroller (see FIG. 8). The microcontroller then reads the turn request information and commands a motor controller circuit (see below) to turn the vehicle according to the rider's induced torque.

A second (rider detection) full bridge strain gauge 144 is bonded at any substantially 90-degree angle onto frame 102, in or near center region 108 where rider weight induces stress, e.g., at a top side and/or bottom side of the frame in that region. Strain gauge 144 may be amplified with an amplifier circuit 146, which may be substantially identical to circuit 142 (see FIG. 5), and is configured to detect rider weight-induced strain on vehicle 100. As the rider steps anywhere onto the top-facing side of the vehicle, a strain is induced and detected by this sensor, thereby indicating when a rider is present and enabling the motor drive system. A magnitude of the induced stress may be proportional to rider weight. This control system may be referred to as the rider-detect system or rider detection. When the rider steps off the vehicle the control system will stop driving the wheels (e.g., by shutting off the motors), such that the vehicle comes to a stop, and/or may disable the self-balancing functions. In some examples, a single or half bridge strain gauge may instead be used.

The rider's weight may be precisely calculated based on a magnitude of the detected strain, and this weight may be used to adjust the aggressiveness of the balance control PID loop. This facilitates a less aggressive balance control with a lightweight rider and a tighter more aggressive balance control for a heavier rider, with granular variation in between. This feature increases safety and helps to prevent falls from an overly aggressive vehicle balance system with light rider, or from an underpowered soft-balanced vehicle with heavy rider. In other words, the vehicle's balance loop will be matched appropriately to the rider's weight, as sensed by the second strain gauge.

When rider detection strain gauge 144 indicates that a rider is present, sensed position measurements from balance position sensor 130 and sensed strain measurements from twisting strain gauge sensor 136 are used to drive motors 122, 124 and wheels 114, 116 using a motor controller circuit 148. Outputs of balance position sensor 130 and twisting strain gauge sensor 136 are used by motor controller circuit 148 to drive motors 122, 124. Motors 122 and 124 are controlled, for example, to bring the vehicle into a self-balanced state, to drive forward or reverse, and/or to turn the vehicle according to the rider's indicated desire. Balance control logic in controller circuit 148 receives the sensed position measurements and drives the wheels toward self-balancing. Self-balancing control logic is described in further detail below.

Generally speaking, drive motors according to the present teachings may be configured to (i) drive the wheels of the vehicle in unison to cause the vehicle to move linearly in response to balanced forces on the foot placement sections; (ii) drive the wheels toward self-balancing the platform in response to inclination (e.g., rotation) of the platform sensed by a sensor such as a balance position sensor; and/or (iii) to drive the wheels differentially to cause the vehicle to turn in response to twisting strain or stresses sensed by a sensor such as a strain gauge.

Twist strain sensor 136 measures inferred rider body position by sensing the strain on fixed frame 102 in center region 108. This data is then used by motor controller circuit 148 to command differing torque to motors 122 and 124, causing vehicle 100 to turn in the rider's desired direction. In some cases, torque commands may include a proportional amount of opposing differential torque to each wheel's motor. In some cases, torque commands may include an appropriate amount of torque to achieve a proportional amount of opposite differential velocity to each wheel's motor. The more twist force applied to vehicle frame 102 by the rider, i.e., by pressing the toes on foot placement area 104 and the heel on foot placement area 106 (or vice versa), the more sharply the vehicle will be turned.

The rider's turn request, e.g., in the form of measured twisting strain, may be used in the control system to apply opposite torque to each motor 122, 124, thereby driving the vehicle in the desired yaw direction and velocity. The control system may monitor the yaw rate (e.g., using a MEMS rate gyro) to determine the yaw direction and velocity, to ensure the rider's yaw command is properly executed and within safe margins. An anti-yaw-spin function may command a counter-yaw torque based on the yaw rate (e.g., measured by the MEMS rate gyro), thereby preventing unsafe spin speeds. This anti-yaw-spin command may be exponential, based on the yaw rate gyro output. In some examples, yaw velocity and direction may be measured by the difference between the two wheels' revolution speeds (e.g., RPM).

As mentioned above, overall balance control PID aggressiveness may be lessened in response to a lightweight rider and increased as the rider's weight rises. Additionally or alternatively, the reactivity of motor controller circuit 148 with respect to turning may also be automatically adjusted based on rider weight, and/or may be adjusted to different selectable rider modes. It may be advantageous to provide an automatically-adjusting turning rate sensitivity that depends on the rider's weight, for example, because a lightweight rider may not be able to induce as much twisting stress as a heavier rider. Accordingly, a lightweight rider may need more twist sensitivity and a heavier rider less sensitivity.

In examples where rider modes are selectable, for example, a new rider may select a more sluggish, less responsive "learning" mode that provides a safer and more comfortable turning speed. Meanwhile, an expert rider may select a very fast and responsive turning speed. In some examples, this rider mode can be communicated to motor controller circuit 148 through a wireless connection device 150 disposed on vehicle 100, such as a Bluetooth Smart (also known as BLE) module, e.g., using a smartphone app.

In some examples, vehicle 100 may save in memory the desired settings of each individual rider, e.g., according to his or her measured weight, and/or may recall a previously established profile (e.g., through a wireless connection to a smartphone). Such a profile may include information regarding balance aggressiveness, turning sensitivity, maximum speed, and/or the like.

Strain gauges are initially calibrated to center when zero strain is applied to the frame. However, strain gauges have a known tendency for their accuracy to drift over time. In some examples, the control logic of vehicle 100 may calibrate, upon startup, the zero points of any or all strain gauges. The calibration may be averaged and saved in memory over several startup events to prevent inadvertent strain adversely affecting the calibration. Accordingly, as the vehicle is used it will be gradually calibrated with each power-on cycle.

The user may be directed to power the vehicle without any weight or strain applied to the frame, such that at startup the strain gauges can be automatically zeroed/centered to cancel out drift. Drift will be gradual over time, so this power-up calibration may be configured to affect the drift value by a small amount, as to avoid erroneous calibration by an accidental strain applied during startup.

An erroneous calibration may be detected for example if, upon power-up, a very large calibration need is measured. This error will be ignored and the rider may be warned accordingly. A full user-initiated calibration method may be provided as well (e.g., a "tare" button or command).

In some examples, strain gauges may be centered by detecting when a sensor is being quickly saturated while vehicle 100 is ridden. In these examples, the gauge will be slowly centered over time to ensure full movement in both directions. In some examples, center calibration of the zero point of a strain gauge may be achieved using a digital to analog converter (DAC) output of the microcontroller connected to the strain gauge through a high value resistor (e.g., 470 K Ohms). This DAC output will essentially replace a potentiometer 152 of circuit 142, 146 (see FIG. 5) and allow the microcontroller to adjust the center points of the strain gauge full bridge system.

In some examples, strain gauges may alternatively or additionally be placed under forward and aft portions of each foot placement area (104, 106), to directly detect the weight of the toe and heel of each foot. For example, four strain gauge systems in total may be used to respectively measure the toes and heels of a rider (two under each foot placement area). The measured strain could then be used to determine the turning intention of the rider in a similar manner, and also to determine when a rider is on or off the vehicle.

In some examples, a remote control feature may be implemented to control vehicle 100 using a portable electronic device (e.g., a smartphone) and installed app, via wireless module 150. This feature may be enabled or disabled by the rider detection circuit, e.g., to prevent remote control when a rider is present. In some examples, the rider detection weight threshold may be adjusted using the rider's smartphone app and wireless module 150, such that only riders above a certain weight are permitted to use the vehicle (e.g., preventing children from unauthorized use).

In some examples, foot placement areas 104 and 106 may be implemented both on the top and the bottom of the vehicle, such that the platform and/or vehicle is symmetrical with respect to riding surface. In these examples, a rider can ride on the "top" side or "bottom" side, whichever may be more convenient at the time when the rider approaches the vehicle. The rider detect can detect weight in either direction, and be configured to drive toward self-balancing with the rider-weighted side defined as "up".

Figure 6:
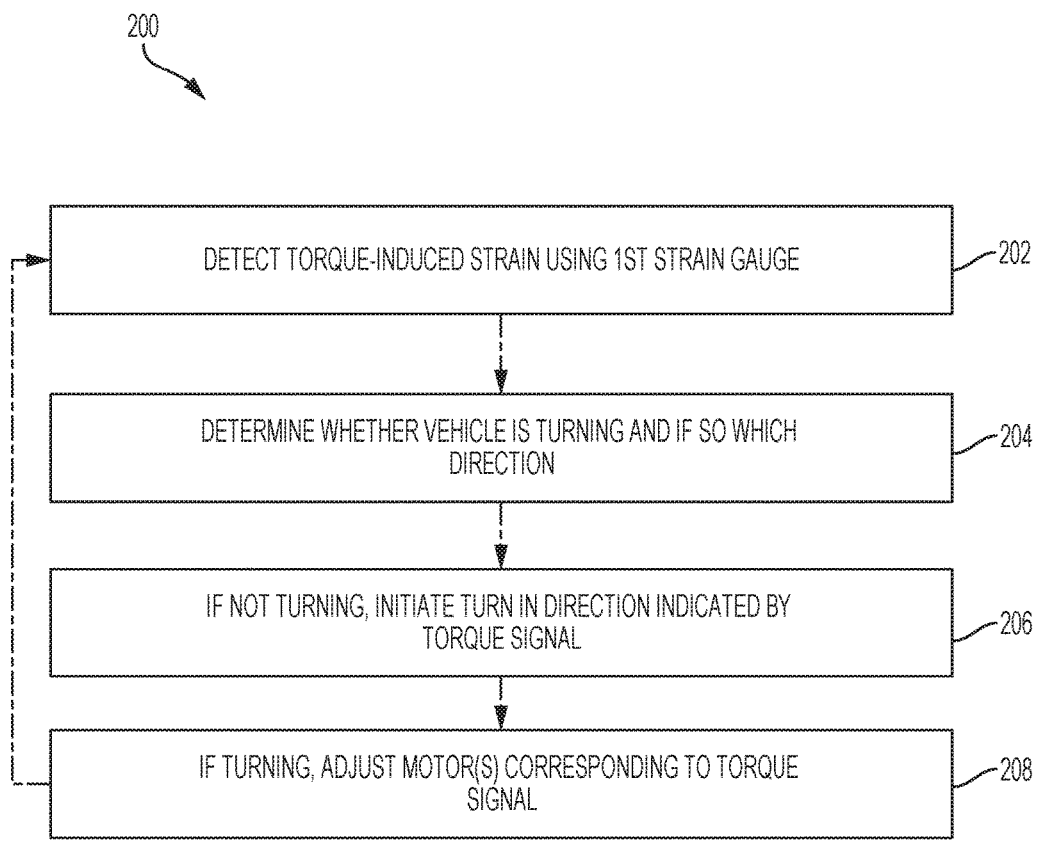
FIG. 6 is a flow chart depicting steps in an illustrative method for controlling vehicle turn characteristics in response to twist strain.
Figure 7:
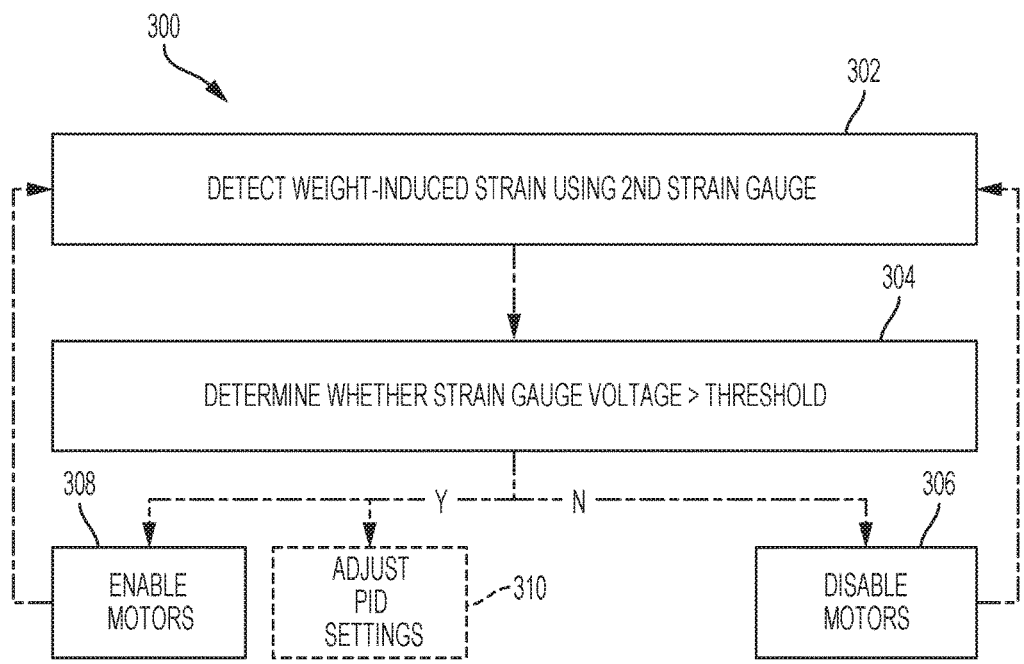
FIG. 7 is a flow chart depicting steps in an illustrative method for rider detection in accordance with aspects of the present disclosure.

Turning to FIGS. 6 and 7, examples of a turn control method and a rider detection method will now be described. Each method may be carried out by any suitable controls of vehicle 100, such as motor controller circuit 148 or other suitable control systems (e.g., as described below). FIGS. 6 and 7 are flowcharts illustrating steps performed in some examples, and may not recite the complete process or all steps of the method. The multiple steps depicted may be performed in conjunction with vehicles and sensing and control systems according to aspects of the present disclosure. Although various steps of the methods are described below and depicted in FIGS. 6 and 7, the steps need not necessarily all be performed, and in some cases may be performed in a different order than the order shown FIG. 6 depicts steps of a method 200 for controlling the turning of vehicle 100 based on strain detected by twist-induced strain gauge 136. Accordingly, step 202 includes detecting torque-induced strain using a first strain gauge. As described above, the first strain gauge may be oriented at approximately or exactly 45-degrees with respect to a long axis of the vehicle (i.e., also with respect to the centerline of the vehicle and/or a direction of travel). Step 204 includes determining whether the vehicle is already turning and, if so, in which direction. This may be achieved, for example, using a MEMS yaw gyro and/or by receiving information from the wheel motors regarding their relative rotational speeds.

Step 206 includes, if the vehicle is not turning, initiating a turn of the vehicle in the direction indicated by the torque signal measured by the first strain gauge. For example, torque may be applied to one or both wheel motors, in differing amounts, to cause the vehicle to turn. If the vehicle is already turning, step 208 includes adjusting the torque of one or both motors to affect the desired turn. For example, the torque of one wheel motor may be reduced or increased, depending on the speed of the turn already in progress. In some instances, the vehicle may be turning in a different direction than desired, in which case torque must be gradually transitioned to reverse the direction of the turn. As indicated in FIG. 6, this series of steps is a loop, such that rider-induced twisting of the vehicle frame is monitored and responded to on a continuous and/or continuing basis.

FIG. 7 depicts steps of a method 300 for controlling the motors of vehicle 100 based on weight-induced strain detected by strain gauge 144. Accordingly, step 302 includes detecting a weight-induced strain using a second strain gauge. As described above, the second strain gauge may be oriented at approximately or exactly 90-degrees with respect to a long axis of the vehicle (i.e., also with respect to the centerline of the vehicle and/or a direction of travel). Step 304 includes determining whether the detected strain (i.e., strain gauge voltage) is greater than a selected threshold. This prevents false positives and avoids unwanted responses from the system. In some examples, the threshold may be selected to exclude lightweight riders (e.g., children) from using the vehicle. If strain voltage is less than the threshold, step 306 includes disabling the motors of the vehicle. If strain voltage is higher than the threshold, step 308 includes enabling the motors and may also result in step 310, in which the PID settings of the balance and/or turn control system are automatically adjusted based on the weight of the rider, as described above.

Illustrative Control Systems and Methods

Figure 8:
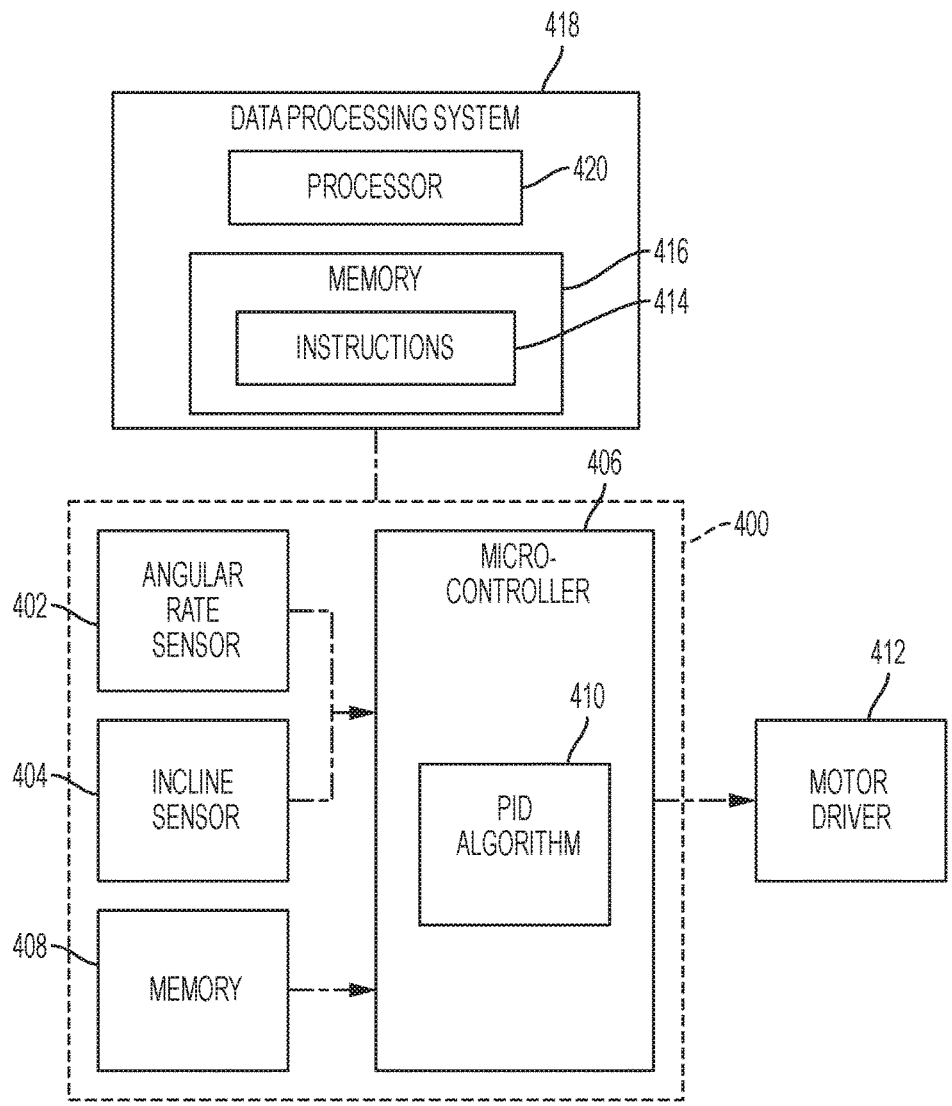
FIG. 8 is a block diagram depicting selected components in an illustrative control system in accordance with aspects of the present disclosure.
Figure 9:
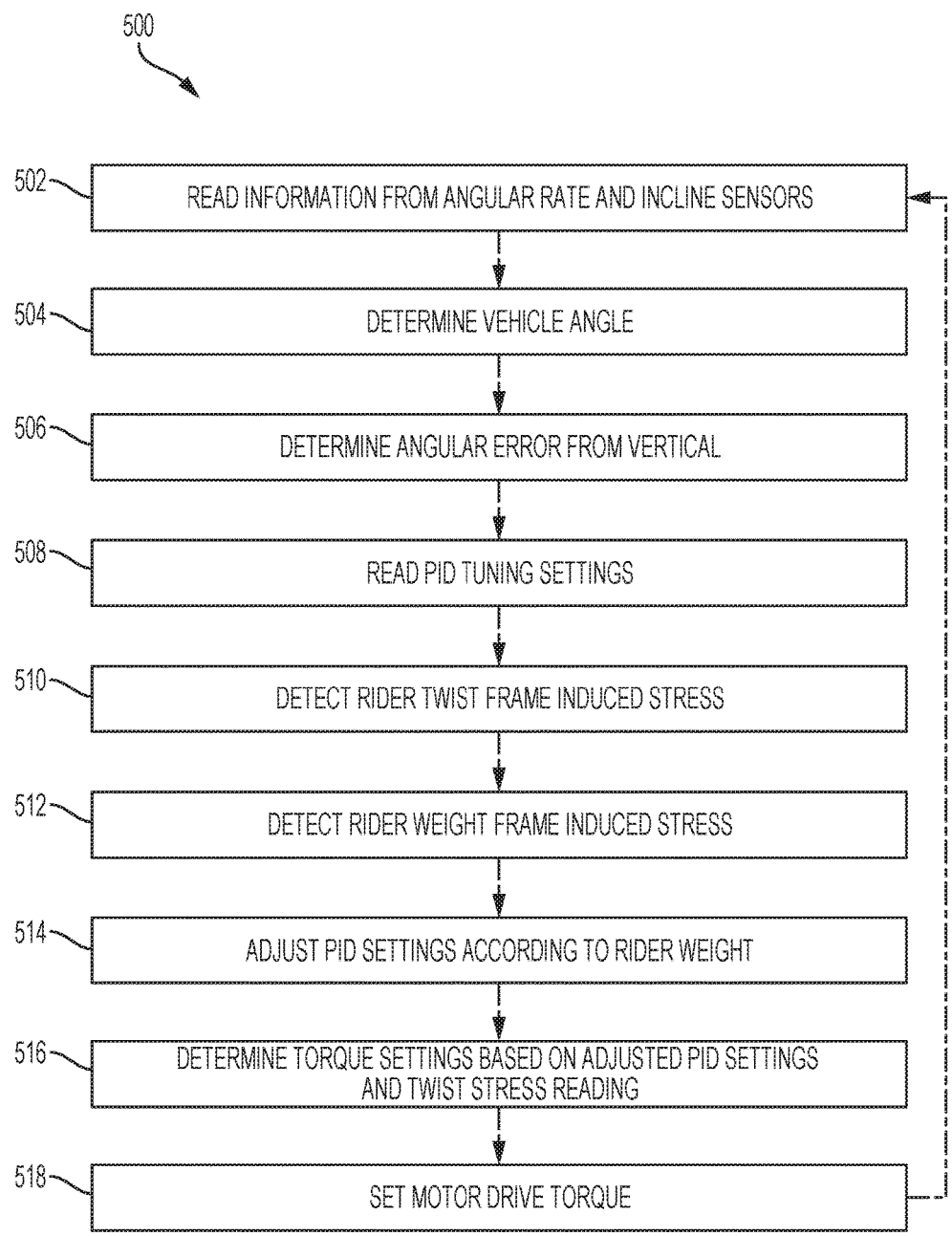
FIG. 9 is a flow chart depicting steps in an illustrative method for controlling motors of a self-balancing vehicle using a control system such as the one shown in FIG. 8.

As shown in FIGS. 8 and 9, this section describes an illustrative control system 400 suitable for use in self-balancing vehicles according to the present teachings (e.g., vehicle 100 and 600), as well as related balance control and vehicle turning methods. Control system 400 may be an example of (or may include aspects of) motor controller circuit 148.

FIG. 8 is a schematic block diagram showing balance and turn control system 400. Control system 400 may include an angular rate sensor 402 (e.g., a three-axis MEMS gyro sensor integrated circuit (IC)), one or more incline sensors 404 (e.g., a three-axis MEMS accelerometer IC), a microcontroller or microprocessor 406, and a memory 408.

Microcontroller 406 may have sufficient computing power to receive sensor data and calculate the required torque needed to safely and comfortably balance the electric self-balancing vehicle. Microcontroller 406 receives data from angular rate sensors 402 and incline sensors 404, and determines the tilt of vehicle 100 in relation to gravity. Gravity is used here to denote a vertical vector or a vertical axis in relation to the earth. Tilt of vehicle 100 is used here to denote the angle between gravity and longitudinal axis of the vehicle in the plane defined by the forward and reverse direction of vehicle 100.

Angular rate sensor(s) 402 may include any suitable rate sensor configured to measure the rate of change of the incline of vehicle 100, such as a three-axis MEMS gyro rate sensor having a maximum of 300 degrees per second. Other components that generate a similar signal may be used. Angular rate sensor 402 of control system 400 is held in a fixed position in relation to frame 102, and provides the rate of angular movement of frame 102 to microcontroller 406. The range of rate output and sensitivity of the sensor(s) is configured to adequately provide accurate data while not saturating during normal use.

Incline sensor(s) 404 may include any suitable incline sensing device, such as a MEMS capacitive-type, three-axis accelerometer with a plus-or-minus two gravity range component. Other components that generate a similar signal may be used. Incline sensor 404 of control system 400 is fixed in relation to frame 102, and provides the inclination of frame 102 in relation to gravity.

Memory 408 may include any suitable digital storage device (e.g., a non-volatile memory, which does not lose data when turned off) and may store instructions and PID tuning parameters. Microcontroller 406 may use the PID parameters when executing instructions stored in memory 408 to implement a PID algorithm 410. The PID algorithm sends a control signal to motor drivers 412 located on controller board 132. The motor drivers set the current or voltage sent from battery 134 to electric motors 122, 124. PID parameters may be automatically adjusted per the rider's weight, e.g., making them more aggressive with heavier riders.

Vehicle 100 may further include instructions 414 stored in a memory 416 of a data processing system 418 (e.g., a personal computer) having its own processor 420. Instructions 414 may be supplied to computer 418 as a download from a computer network (e.g., the Internet) or on a physical medium (e.g., on a portable memory storage device such as a thumb drive, CD, or DVD). Control system 400 may be configured to connect to computer 418, which may upload instructions 414 to vehicle 100. Instructions 414 and computer 418 may provide for modification of instructions or parameters stored in memory 408 of the balance control system. Control system 400 may connect to computer 418 through wired or wireless methods, e.g., by a data cable or by a wireless connection using radio frequency signals and protocols, or by other suitable wireless means.

FIG. 9 is a flow chart depicting steps in an illustrative method 500 for achieving balance control, acceleration, deceleration, turning, and stopping of a vehicle such as vehicle 100, using control system 400.

At step 502, microcontroller 406 reads angular rate sensors 402 and incline sensors 404. The current angle of vehicle 100 in relation to gravity is calculated, e.g., primarily using the data from angular rate sensor 402. The angular rate is retrieved at a set interval. Approximately 500 to 1400 times per second has been found to be satisfactory, but other intervals are suitable. The angular rate can be incorporated into the current incline angle in proportion to the time base to provide a very accurate and responsive current angle of vehicle 100. Although the angle calculation may be accurate and responsive, it may drift over time. This drift can be corrected by slowly incorporating the incline sensor's calculated tilt angle into the current angle of the vehicle, as explained below.

Incline sensor 404 data is read at a similar periodicity as the angular rate sensor 402. At step 504, all three axes of accelerometer-based incline sensor 404 are read. The three axes, referred to as X, Y, and Z, form a standard coordinate system. Z is defined here as the vertical direction, corresponding to gravity, with X in the left-right direction, and Y in the forward-back direction. One axis in the Y plane would be sufficient information to determine tilt angle. Two axes in the Y-Z plane would provide a more accurate tilt angle. Three axes can determine how much total centrifugal force, acceleration, deceleration, and gravity is being applied to incline sensor 404. The total combined accelerations of all three axes, while vehicle 100 is stationary, should be equal to one earth gravity (G). If more or less than one G is indicated, then external forces are being applied to vehicle 100. The total combined accelerations can be calculated with the following formula:

$$\sqrt{X^2+Y^2+Z^2}$$

The actual tilt angle relative to earth's gravity is averaged or damped over a period of time sufficient enough to filter out noise and outside (non-gravity) forces. Accelerometer data with a total acceleration of more or less than one G will be discarded as inclusive of outside forces such as horizontal acceleration, horizontal deceleration, and centrifugal force. These outside forces would add error to the tilt calculation. Fore-aft tilt is calculated using the Y and Z axes as shown by the following formula:

$$\tan^{-1}\frac{Y}{Z}$$

Fore-aft tilt is included in the current angle of vehicle 100 sufficiently enough to overcome any drift incorporated by angular rate sensor 402. At step 506, angular error with respect to vertical (i.e., relative to gravity) is calculated.

At step 508, the PID tuning parameters are retrieved. These PID tuning parameters are used in PID algorithm 410 to calculate the required torque settings to accelerate, decelerate, and/or balance vehicle 100 in relation to gravity.

A PID controller has three main elements: proportional control, integral control, and derivative control. These three elements are sufficient to create a responsive, accurate, and stable system. Proportional control (P) is tuned by the proportional gain (kP) parameter stored in memory 408. A proportional controller's output is the error signal multiplied by kP and is responsible for providing a responsive system. Integral control (I) is tuned by the integral gain (kI) parameter stored in memory 408. An integral controller's output is the sum of all preceding error signals multiplied by kI and is responsible for providing an accurate system. It is also necessary to have limits on the sum to limit oscillating of the system. Integral control may not be necessary in all embodiments, instead using a PD loop. Differential control (D) is tuned by the differential gain (kD) parameter stored in memory 408. A differential controller's output is the velocity of the error signal multiplied by kD and is responsible for providing a stable system. The output of the PID controller is the sum of all P, I, and D outputs. Use of the PID controller in this application should be readily apparent to those skilled in the art.

At step 510, the rider-induced frame twist is measured, as described above with respect to twist-sensing strain gauge 136. At step 512, the rider weight is measured, as described above with respect to rider detection strain gauge 144. At step 514 the PID settings are adjusted according to the rider's weight. At steps 514 and 516, the previously retrieved and adjusted PID settings are used in the algorithm to calculate and (at step 518) to set the required torque settings to drive the vehicle into a vertical position in relation to gravity and to turn (yaw) the vehicle according to the rider's indicated intention. This simple control technique inherently allows the rider to lean forward or angle his/her ankles forward to accelerate the vehicle 100 or lean back or angle his/her ankles back to decelerate or stop the vehicle while always maintaining vertical balance.

Second Illustrative Self-Balancing Vehicle

As shown in FIGS. 10-15, this section describes another illustrative two-wheeled self-balancing vehicle 600 with controls having one or more strain gauge systems, as well as related methods. Vehicle 600 is an example of the vehicles described in the Overview section above, and is an example of vehicle 100. Accordingly, corresponding components may be labeled with similar reference numbers. Vehicle 600 should be understood to include the various features, including balance and turning control systems, of vehicle 100, substantially as described above (although possibly disposed in different locations). Additional and/or differentiating features of vehicle 600 are described below.

Vehicle 600 includes an elongate frame 602 including a rigid foot placement platform 604 defining a long axis L, a centerline C, and having a first foot placement section 606 and a second foot placement section 608. The foot placement sections are rigidly connected together, such that the foot placement sections do not pivot relative to each other, except possibly for some flex in the materials used to construct the platform and frame.

A center region 610 of frame 602 is generally defined between the two foot placement sections, as indicated in FIGS. 10-14. A grip-enhancing surface 611 is included on an upper face of platform 604. In this example, surface 611 includes a plurality of raised hexagonal shapes, with corresponding channels running between the raised shapes. However, any suitable grip-enhancing surface may be included.

A first lateral end (or side) 612 of platform 604 includes a first wheel 614, and a second lateral end (or side) 616 of platform 604 includes a second wheel 618. Both wheels are oriented to rotate on a common axis of rotation, which is substantially parallel to long axis L of platform 604. Wheels 614 and 618 are disposed adjacent to the lateral sides of platform 604. A pair of fenders 620, 622 extend upward from frame 602 to at least partially overhang wheels 614 and 618, respectively. In some examples, fenders 620 and 622 may be detachable. In some examples, fenders 620 and 622 may be attached to an axle or a portion of frame 602 that does not tilt with platform 604. In some examples, the fenders may be selectively positionable differently than platform 604. This may be beneficial, for example, to ensure the fenders remain directly above the wheels during operation, and/or may facilitate flipping platform 604 over to operate vehicle 600 while standing on the opposing (bottom) side.

Figure 10:
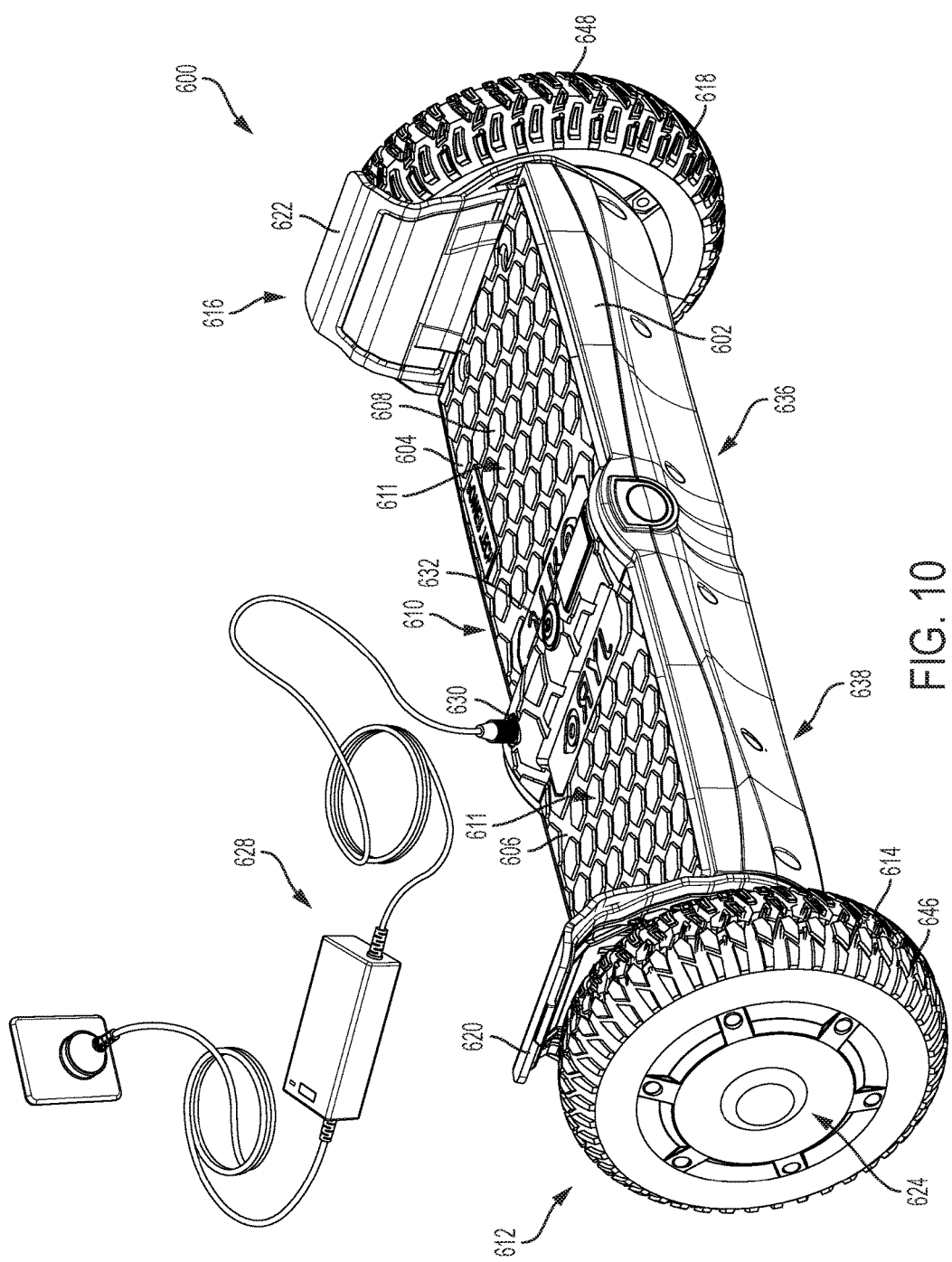
FIG. 10 is a rear oblique isometric view of another illustrative two-wheeled self-balancing vehicle according to the present teachings.
Figure 11:
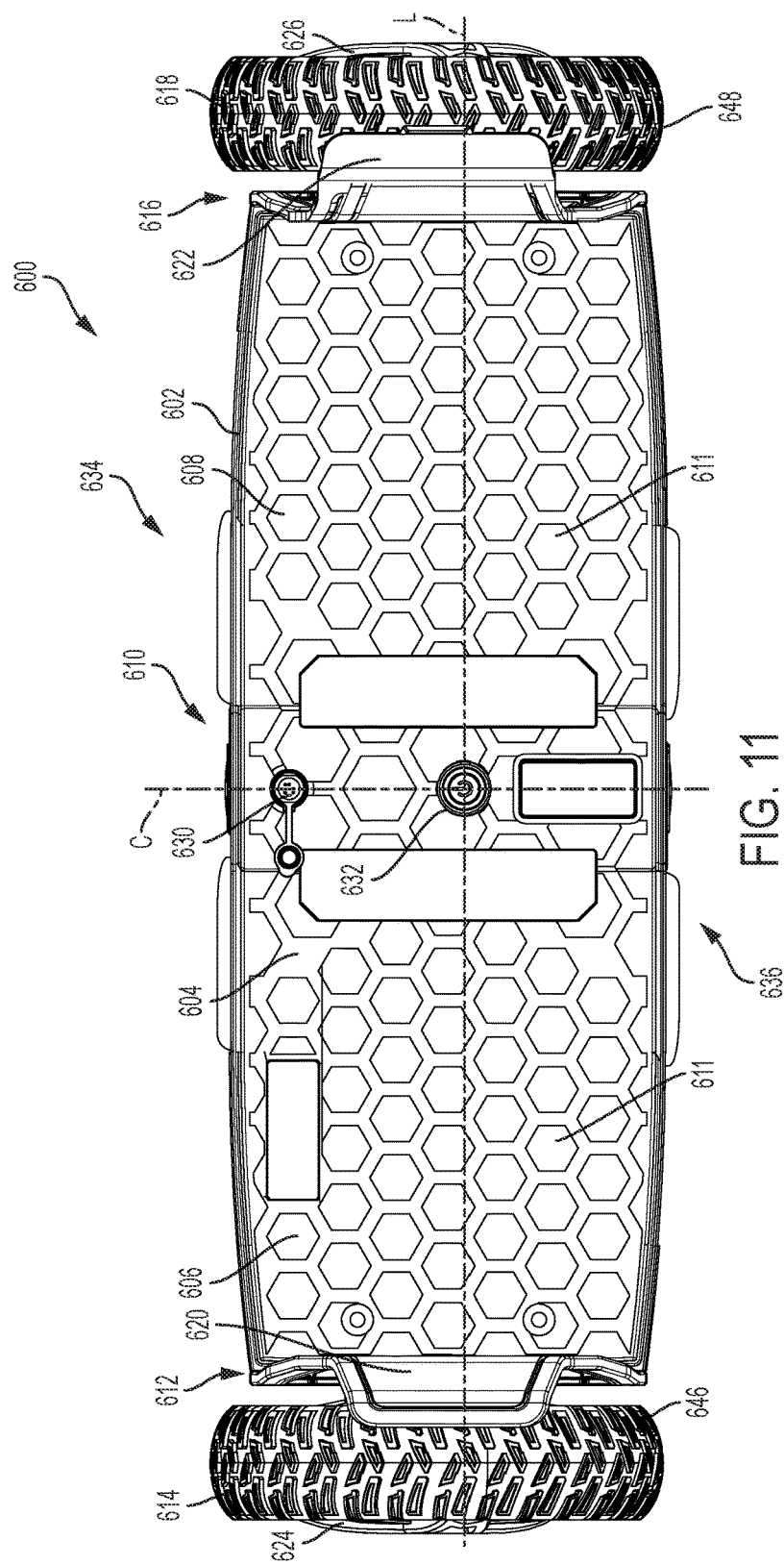
FIG. 11 is a top plan view of the vehicle of FIG. 10.

As described with respect to vehicle 100, vehicle 600 includes a balance position sensor attached to platform 604 and related circuitry, as well as a rechargeable battery to power various components, including drive motors 624, 626 (e.g., hub motors) associated with each wheel. As shown in FIG. 10, an AC adapter 628 may be used to charge the battery of vehicle 600 through a power port 630 in center region 610. An on/off switch 632 may be disposed on center region 610 as well.

Platform 604 further includes a front end 634, a rear end 636, and a bottom surface 638. Bottom surface 638 may be spaced from the upper grip surface 611 of frame 602 by walls at front end 634 and rear end 636, forming a substantially weatherproof container for housing internal components (e.g., sensors and circuitry). Various covered access ports 640 may be located on bottom surface 638 (and/or other suitable locations) to allow access to the internal components.

Figure 12:
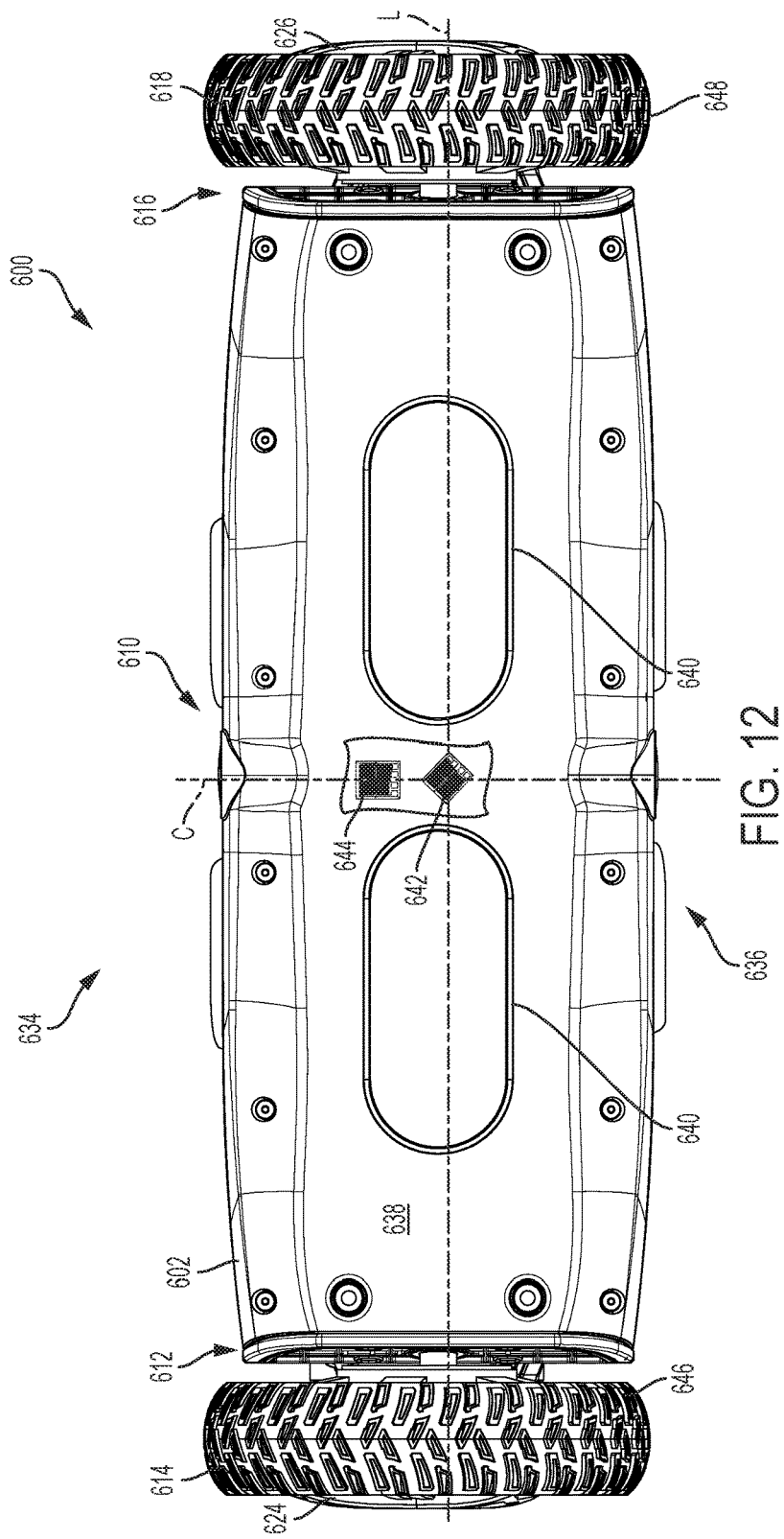
FIG. 12 is a bottom plan view of the vehicle of FIG. 10.
Figure 13:
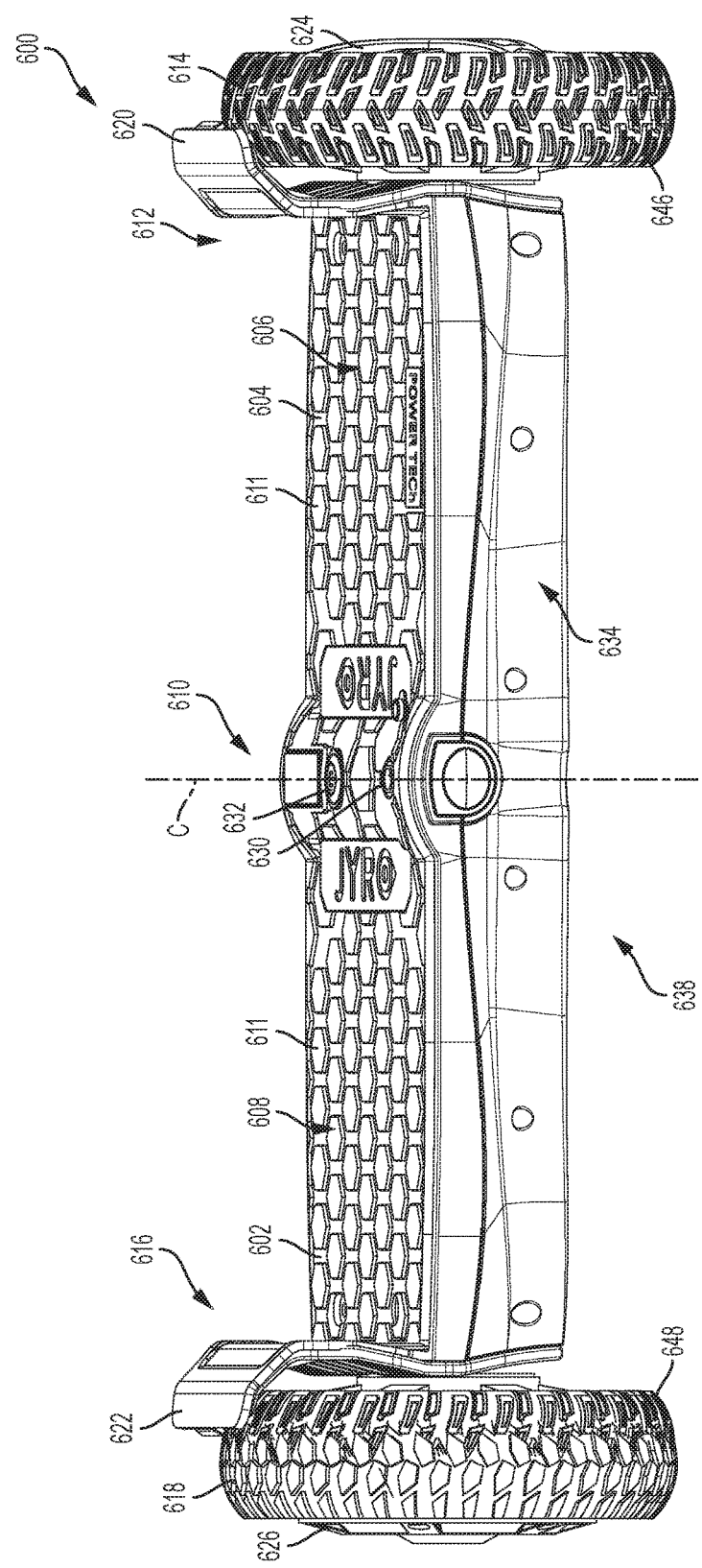
FIG. 13 is a front isometric view of the vehicle of FIG. 10, taken from above the plane of the vehicle.

As shown in FIG. 12, a twist-sensing strain gauge 642 may be disposed in center region 610, adjacent to bottom surface 638, and oriented at 45-degrees with respect to centerline C. A second, rider detection strain gauge 644 is also disposed in center region 610, spaced from strain gauge 642 and oriented at 90-degrees relative to centerline C and/or long axis L. Both strain gauges 642 and 644 are substantially identical in structure and operation to strain gauges 136 and 144, respectively. Accordingly, strain gauge 642 is configured to sense twisting strain in the platform induced by imbalanced forces exerted upon the first and second foot placement sections (for example, by an imbalanced toe/heel combination as described above). Similarly, drive motors 624 and 626 are configured to drive the wheels toward self-balancing platform 604 in response to inclination of the platform sensed by the balance position sensor, and to drive the wheels differentially to cause the vehicle to turn in response to twisting strain sensed by strain gauge 642.

Wheels 614 and 618 may include tires 646 and 648, respectively. Tires 646 and 648 may include a surface tread configured to provide enhanced traction on expected terrain. Tires 646 and 648 may include pneumatic tires, liquid, solid, or gel-filled tires, or any other suitable tire.

In the present disclosure it has been stated that the drive motors 122, 124 and 624, 626 are configured to:

drive the wheels 114, 116 and 614, 618 toward self-balancing the platform in response to inclination of the platform sensed by the balance position sensor, and are configured to drive the wheels differentially to cause the vehicle 100, 600 to turn in response to twisting strain sensed by the first strain gauge;

drive the wheels in unison to cause the vehicle to move linearly in response to balanced forces on the first and second foot placement sections;

drive the wheels toward self-balancing the platform in response to rotation of the platform sensed by the balance position sensor, and to drive the wheels differentially to cause the vehicle to turn in response to strain sensed by the first strain gauge; and/or carry out any other action described herein.

It can also equally be said that the control system 400 is configured to cause the drive motors to drive the wheels 114, 116 and 614, 618 in any of these aforementioned ways.

In the present disclosure, it has been stated that the strain gauges sense strain and that the strain gauges sense stress. This is because stress and strain in a material are related to one another, in the sense that, when a material undergoes stress, it undergoes strain, and when a material undergoes strain, it undergoes stress.

Additional Examples and Illustrative Combinations

This section describes additional aspects and features of self-balancing electric vehicles according to the present teachings, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A self-balancing electric vehicle, comprising:

a platform defining a long axis, a first foot placement section, and a second foot placement section rigidly coupled to the first foot placement section;

a first wheel disposed adjacent to a first lateral end of the platform and a second wheel disposed adjacent to a second lateral end of the platform, wherein the first and second wheels share a common axis of rotation parallel to the long axis of the platform;

a balance position sensor attached to the platform and configured to sense inclination of the platform;

a first strain gauge attached to the platform and configured to sense twisting strain in the platform induced by imbalanced forces exerted upon the first and second foot placement sections;

a first drive motor configured to drive the first wheel, and a second drive motor configured to drive the second wheel, wherein the drive motors are configured to drive the wheels toward self-balancing the platform in response to inclination of the platform sensed by the balance position sensor, and to drive the wheels differentially to cause the vehicle to turn in response to twisting strain sensed by the first strain gauge.

A1. The vehicle of A0, further comprising a second strain gauge attached to the platform and configured to sense strain in the platform induced by a rider's weight exerted upon the platform.

A2. The vehicle of A1, wherein the first and second strain gauges are disposed between the first foot placement section and the second foot placement section.

A3. The vehicle of A1, wherein the first and second drive motors are configured to be activated when the second strain gauge senses strain exceeding a predetermined minimum, and to be deactivated when the second strain gauge senses strain less than the predetermined minimum.

A4. The vehicle of A1, wherein the first and second drive motors are configured to drive the wheels toward self-balancing the platform in response to inclination of the platform sensed by the balance position sensor and also in response to a magnitude of the strain sensed by the second strain gauge.

A5. The vehicle of A1, wherein the first and second drive motors are configured to drive the wheels differentially to cause the vehicle to turn in response to twisting strain sensed by the first strain gauge and also in response to a magnitude of the strain sensed by the second strain gauge.

A6. The vehicle of any of paragraphs A0 through A5, wherein the first and second drive motors are configured to drive the wheels differentially to cause the vehicle to turn in response to twisting strain sensed by the first strain gauge and also in response to a ride characteristic setting selectable by a rider.

A7. The vehicle of any of paragraphs A0 through A6, wherein the platform includes a top side and a bottom side, and wherein the platform is configured to be flipped over and operated with its top side facing downward and its bottom side facing upward.

B0. A self-balancing electric vehicle, comprising:
a rigid platform including a first foot placement section and a second foot placement section which is substantially rigidly attached to the first foot placement section;

a first wheel associated with the first foot placement section and a second wheel associated with the second foot placement section, wherein the first and second wheels are spaced apart and substantially parallel to one another;

a first drive motor configured to drive the first wheel, and a second drive motor configured to drive the second wheel;

a vehicle balance position sensor coupled to the rigid platform; and a strain gauge coupled to the rigid platform;

wherein the drive motors are configured to drive the wheels toward self-balancing the platform in response to data from the vehicle balance position sensor, the drive motors are configured to drive the wheels differentially to cause the vehicle to turn in response to data from the strain gauge indicating imbalanced forces on the first and second foot placement sections, and the drive motors are configured to drive the wheels in unison to cause the vehicle to move linearly in response to balanced forces on the first and second foot placement sections.

B1. The vehicle of B0, wherein the strain gauge is oriented diagonally with respect to the rigid platform, such that the strain gauge measures only twisting aspects of the imbalanced forces on the first and second foot placement sections.

B2. The vehicle of any of paragraphs B0 through B1, wherein the strain gauge is disposed in a center region of the rigid platform, between the first and second foot placement sections.

B3. The vehicle of B2, wherein the strain gauge is disposed adjacent to a bottom surface of the rigid platform.

B4. The vehicle of any of paragraphs B0 through B3, wherein the drive motors are configured to drive the wheels differentially to cause the vehicle to turn in response to data from the strain gauge and in response to a mode of the vehicle selected by a user.

B5. The vehicle of any of paragraphs B0 through B4, wherein the strain gauge is a first strain gauge, the vehicle further including a second strain gauge coupled to the rigid platform and configured to sense strain in the platform induced by a weight of a rider exerted upon the platform.

B6. The vehicle of B5, wherein the drive motors are configured to drive the wheels differentially to cause the vehicle to turn in response to data from the strain gauge and in response to the weight of the rider.

C0. A self-balancing electric vehicle, comprising:
a platform including a first foot placement section and a second foot placement section which are substantially rigidly attached to each other;

a first wheel associated with a first lateral side of the platform and a second wheel associated with a second lateral side of the platform, wherein the first and second wheels are spaced apart and share a common axis of rotation which is substantially parallel to a long axis of the platform;

a balance position sensor configured to sense rotation of the platform about its long axis;

a strain gauge configured to sense strain (and therefore stresses) induced in the platform by imbalanced forces applied to the first foot placement section and the second foot placement section;

a first drive motor configured to drive the first wheel, and a second drive motor configured to drive the second wheel, wherein the drive motors are configured to drive the wheels toward self-balancing the platform in response to rotation of the platform sensed by the balance position sensor, and to drive the wheels differentially to cause the vehicle to turn in response to strain (and therefore stresses) sensed by the strain gauge.

C1. The vehicle of C0, wherein the strain gauge measures twisting strain caused by the imbalanced forces.

C2. The vehicle of C1, wherein the strain gauge is coupled to a center region of the platform at an approximately 45-degree angle with respect to the long axis of the platform.

C3. The vehicle of any of paragraphs C0 through C2, further including a second strain gauge coupled to the rigid platform and configured to sense strain in the platform induced by a weight of a rider exerted upon the platform.

C4. The vehicle of C3, further including a control circuit configured to control the first and second drive motors using a proportional-integral-derivative (PID) algorithm, wherein one or more parameters of the PID algorithm are altered based on the weight of the rider detected by the second strain gauge.

C5. The vehicle of claim C3, wherein the drive motors are configured to drive the wheels differentially to cause the vehicle to turn in response to stresses sensed by the first strain gauge and in response to the weight of the rider detected by the second strain gauge.

D. In some examples, the vehicle control systems may not measure, use, and/or need a measurement of the roll angle of the vehicle or rider.

E. In some examples, the vehicle control systems may not measure, use, and/or need a measurement of yaw rate of the vehicle or rider.

F. In some examples, the vehicle may include a wireless connection feature for connecting to a mobile phone, such as BLE (Smart Bluetooth), which allows remote configuration of the turning strain gauges and rider detect strain gauges. The rider can customize the timing, speed, sensitivity, maximum velocity, and/or many other parameters to fully customize the turning functionality to the rider's taste. For example, the vehicle could be placed in "learning" mode for new riders which reduces the sensitivity of the turning sensors; or alternatively in "expert" mode which increases the sensitivity allowing faster control and movements for a more skilled rider. This connection may also provide, and allow to be set, vehicle data such as speed, battery level, distances, ride modes, maximum speed, maximum turn rate, rider detect threshold, strain gauges zero calibration, charging status, etc.

G. In some examples, the frame may be hinged in the middle for ease of storing and transportation. The hinge may be offset to the left or right to allow for nesting of the wheels next to each other when folded. The center platform hinge point may extend up when folded and also serve as a handle. The hinge may have a locking mechanism to prevent undesired hinge movement while riding. The hinge could be in the longitudinal axis allowing the folded vehicle to be as flat and compact as possible.

Advantages, Features, Benefits

The different embodiments and examples of the self-balancing vehicles described herein provide several advantages over known solutions. For example, illustrative embodiments and examples described herein allow an intuitive and simple way to detect the rider position when a desired turn is commanded.

Additionally, and among other benefits, illustrative embodiments and examples described herein allow the manufacture of a simple, reliable, stronger, cost-effective, and customizable vehicle without the complexity of independently movable foot platforms and rider detection switches.

Additionally, and among other benefits, illustrative embodiments and examples described herein facilitate automatic implementation of a softer control for lightweight riders, and a stronger, more aggressive control for heavier riders, thereby greatly adding to the safety of the vehicle.

Additionally, and among other benefits, illustrative embodiments and examples described herein include a strain gauge system that replaces known systems of rubber pads configured to press gates down through optical detectors. The strain gauge system may be cheaper, simpler, more reliable, smaller, lighter and/or more configurable.

Additionally, and among other benefits, illustrative embodiments and examples described herein, compared to vehicles with platforms having independently pivotable foot sections, effectively fix the drive motors together (i.e., to a single rigid platform) allowing torque from both motors to drive forward and backward together when an obstacle is encountered by one wheel.

No known system or device can perform these functions. However, not all embodiments and examples described herein provide the same advantages or the same degree of advantage.

Conclusion

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A self-balancing electric vehicle, comprising:
    a platform defining a long axis, a first foot placement section, and a second foot placement section;
    a first wheel associated with the first placement section and a second wheel associated with the second foot placement section;
    a balance position sensor attached to the platform and configured to sense inclination of the platform;
    a first strain gauge attached to the platform and configured to sense twisting strain in the platform induced by imbalanced forces exerted upon the first and second foot placement sections;
    a first drive motor configured to drive the first wheel, and a second drive motor configured to drive the second wheel, wherein the drive motors are configured to drive the wheels toward self-balancing the platform in response to inclination of the platform sensed by the balance position sensor, and to drive the wheels differentially to cause the vehicle to turn in response to twisting strain sensed by the first strain gauge.

2. The vehicle of claim 1, further comprising a second strain gauge attached to the platform and configured to sense strain in the platform induced by a rider's weight exerted upon the platform.

3. The vehicle of claim 2, wherein the first and second strain gauges are disposed between the first foot placement section and the second foot placement section.

4. The vehicle of claim 2, wherein the first and second drive motors are configured to be activated when the second strain gauge senses strain exceeding a predetermined minimum, and to be deactivated when the second strain gauge senses strain less than the predetermined minimum.

5. The vehicle of claim 2, wherein the first and second drive motors are configured to drive the wheels toward self-balancing the platform in response to inclination of the platform sensed by the balance position sensor and also in response to a magnitude of the strain sensed by the second strain gauge.

6. The vehicle of claim 2, wherein the first and second drive motors are configured to drive the wheels differentially to cause the vehicle to turn in response to twisting strain sensed by the first strain gauge and also in response to a magnitude of the strain sensed by the second strain gauge.

7. The vehicle of claim 1, wherein the first and second drive motors are configured to drive the wheels differentially to cause the vehicle to turn in response to twisting strain sensed by the first strain gauge and also in response to a ride characteristic setting selectable by a rider.

8. A self-balancing electric vehicle, comprising:
   a rigid platform including a first foot placement section and a second foot placement section;
   a first wheel associated with the first foot placement section and a second wheel associated with the second foot placement section;
   a first drive motor configured to drive the first wheel, and a second drive motor configured to drive the second wheel;
   a vehicle balance position sensor coupled to the rigid platform; and
   a strain gauge coupled to the rigid platform;
   wherein the drive motors are configured to drive the wheels toward self-balancing the platform in response to data from the vehicle balance position sensor, the drive motors are configured to drive the wheels differentially to cause the vehicle to turn in response to data from the strain gauge indicating imbalanced forces on the first and second foot placement sections, and the drive motors are configured to drive the wheels in unison to cause the vehicle to move linearly in response to balanced forces on the first and second foot placement sections,
   wherein the strain gauge is oriented diagonally with respect to the rigid platform, such that the strain gauge measures only twisting aspects of the imbalanced forces on the first and second foot placement sections.

9. The vehicle of claim 8, wherein the strain gauge is disposed in a center region of the rigid platform, between the first and second foot placement sections.

10. The vehicle of claim 9, wherein the strain gauge is disposed adjacent to a bottom surface of the rigid platform.

11. The vehicle of claim 8, wherein the drive motors are configured to drive the wheels differentially to cause the vehicle to turn in response to data from the strain gauge and in response to a mode of the vehicle selected by a user.

12. The vehicle of claim 8, wherein the strain gauge is a first strain gauge, the vehicle further including a second strain gauge coupled to the rigid platform and configured to sense strain in the platform induced by a weight of a rider exerted upon the platform.

13. The vehicle of claim 12, wherein the drive motors are configured to drive the wheels differentially to cause the vehicle to turn in response to data from the strain gauge and in response to the weight of the rider.

14. A self-balancing electric vehicle, comprising:
    a platform including a first foot placement section and a second foot placement section;
    a first wheel associated with a first lateral side of the platform and a second wheel associated with a second lateral side of the platform;
    a balance position sensor configured to sense rotation of the platform about its long axis;
    a first strain gauge configured to sense strain induced in the platform by imbalanced forces applied to the first foot placement section and the second foot placement section;
    a first drive motor configured to drive the first wheel, and a second drive motor configured to drive the second wheel, wherein the drive motors are configured to drive the wheels toward self-balancing the platform in response to rotation of the platform sensed by the balance position sensor, and to drive the wheels differentially to cause the vehicle to turn in response to strain sensed by the first strain gauge,
    wherein the first strain gauge measures twisting strain caused by the imbalanced forces.

15. The vehicle of claim 14, wherein the first strain gauge is coupled to a center region of the platform at an approximately 45-degree angle with respect to the long axis of the platform.

16. The vehicle of claim 14, further including a second strain gauge coupled to the rigid platform and configured to sense strain in the platform induced by a weight of a rider exerted upon the platform.

17. The vehicle of claim 16, further including a control circuit configured to control the first and second drive motors using a proportional-integral-derivative (PID) algorithm, wherein one or more parameters of the PID algorithm are altered based on the weight of the rider detected by the second strain gauge.

18. The vehicle of claim 16, wherein the drive motors are configured to drive the wheels differentially to cause the vehicle to turn in response to stresses sensed by the first strain gauge and in response to the weight of the rider detected by the second strain gauge.

19. The vehicle of claim 16, wherein the strain gauge is oriented diagonally with respect to the rigid platform, such that the strain gauge measures only twisting aspects of the imbalanced forces on the first and second foot placement sections.

20. The vehicle of claim 19, wherein the strain gauge is disposed in a center region of the rigid platform, between the first and second foot placement sections.

* * * * *